Figure 1:
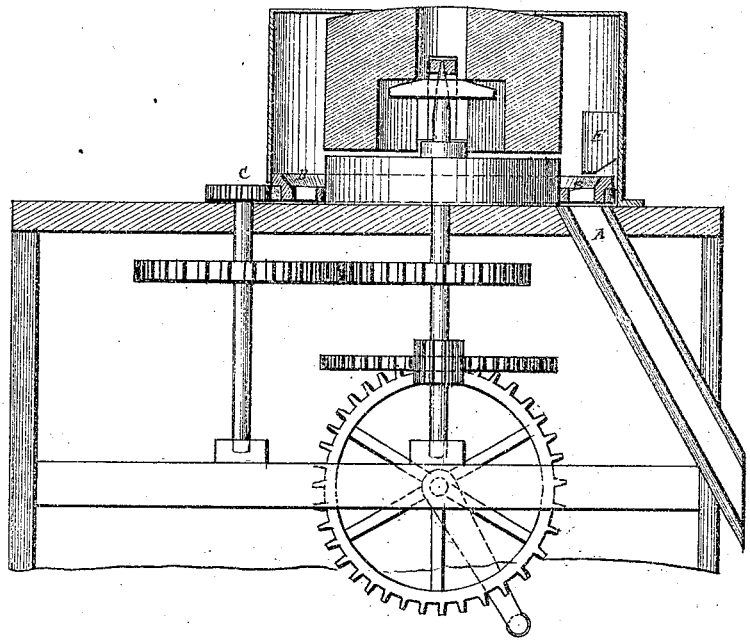

S. T. ECK.
Grinding Mill.

No. 104,946.  Patented July 5, 1870.

UNITED STATES PATENT OFFICE.

SAMUEL T. ECK, OF TANEYTOWN, MARYLAND.

IMPROVEMENT IN GRINDING-MILLS.

Specification forming part of Letters Patent No. 104,946, dated July 5, 1870.

*To all whom it may concern:*

Be it known that I, SAMUEL T. ECK, of Taneytown, in the county of Carroll and State of Maryland, have invented a new and useful Improvement in Grinding-Mills; and I do hereby declare that the following is a full, clear, and exact description thereof, which will enable others skilled in the art to make and use the same, reference being had to the accompanying drawings, forming part of this specification, My invention relates to means for discharging the ground grain from the space between the curb and the rim of the millstone; and it consists in the application of scrapers attached to the periphery of a rotating wheel.

Figure 1 is a sectional elevation through the curb and the floor, showing the application of a wheel driven by gearing from below the floor.

Similar letters of reference indicate corresponding parts.

As at present arranged, the ground substance issuing from the stone must be worked around from the place of issue to the discharge-spout A by the frictional contact of the skirt of the running stone, and before this can be done the space between the curb and the stone must be filled to a considerable extent, which causes heating and clogging, as is well known.

B is the scraping-wheel, driven by a pinion, C, connected by a suitable gear with the mill-spindle. By this means the meal will be discharged as fast as it is ground, while the bottom itself will possess a free ventilation. I propose, also, to apply a scraper, F, to the curb at the spout to scrape the meal from the top of the wheel.

Having thus described all that is necessary to a clear understanding of my invention, what I claim as new, and desire to protect by Letters Patent, is—

The combination, with the stones and curb of a grain-mill, of wheel B and scraper F, arranged and operating together as set forth.

SAMUEL T. ECK.

Witnesses:
 JOHN MCKELLIP,
 WM. N. CURRENS.